Figure 1:
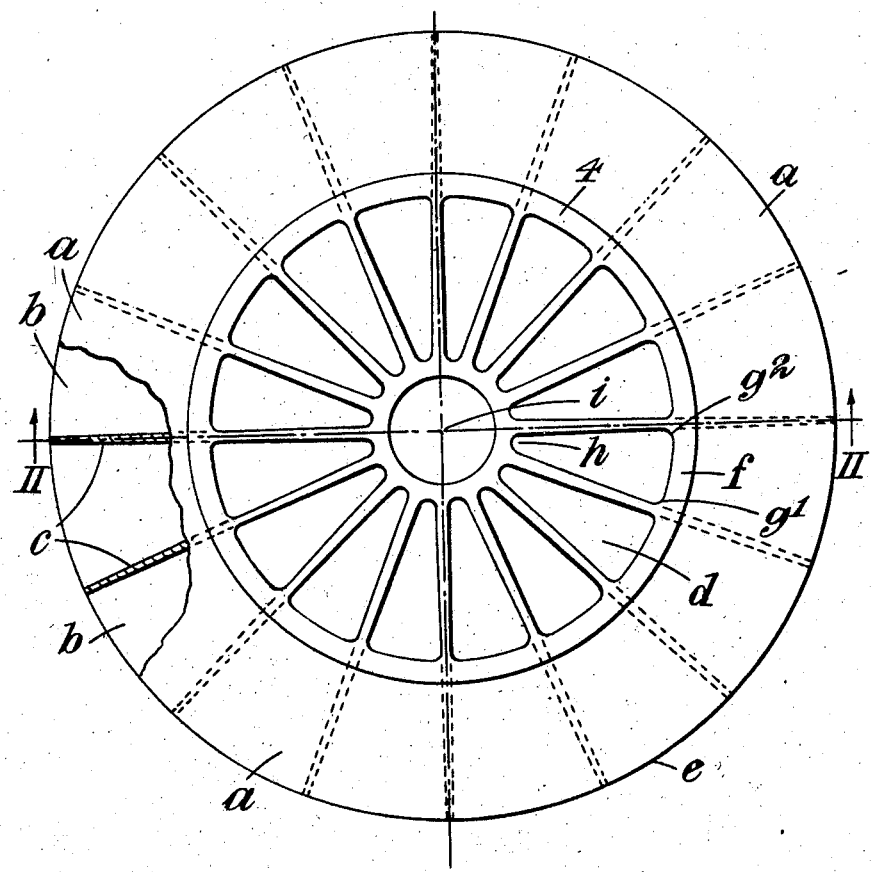

July 2, 1946.  J. T. BOLAS ET AL  2,403,168
MACHINE FOR PRODUCING CONVEX SURFACES
Filed May 30, 1944   4 Sheets-Sheet 1

INVENTORS
JOHN T. BOLAS
R. W. EDWARDS
W. J. LATTY
BY Wilkinson + Mawhinney
ATTYS.

July 2, 1946.  J. T. BOLAS ET AL  2,403,168
MACHINE FOR PRODUCING CONVEX SURFACES
Filed May 30, 1944  4 Sheets-Sheet 2
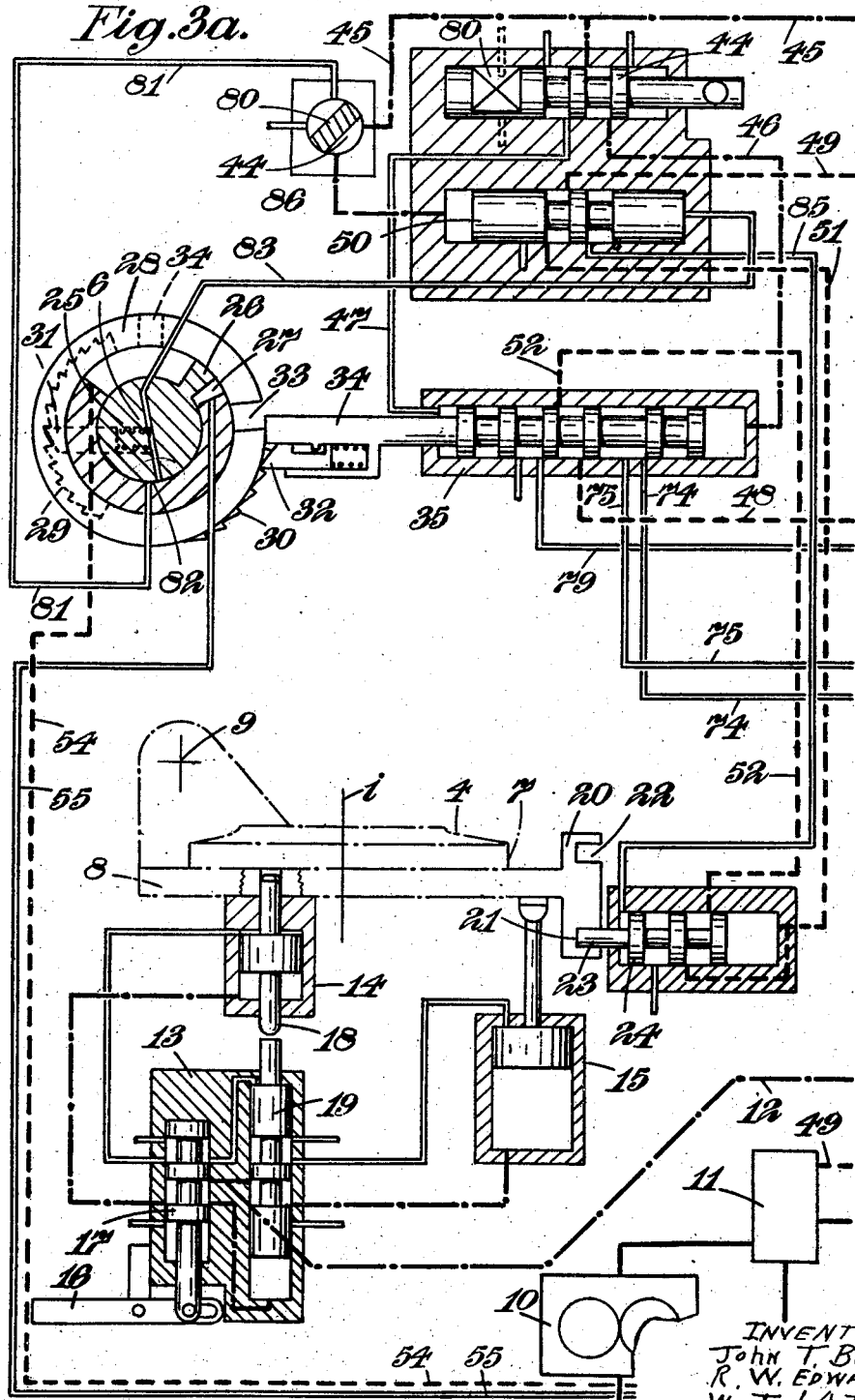

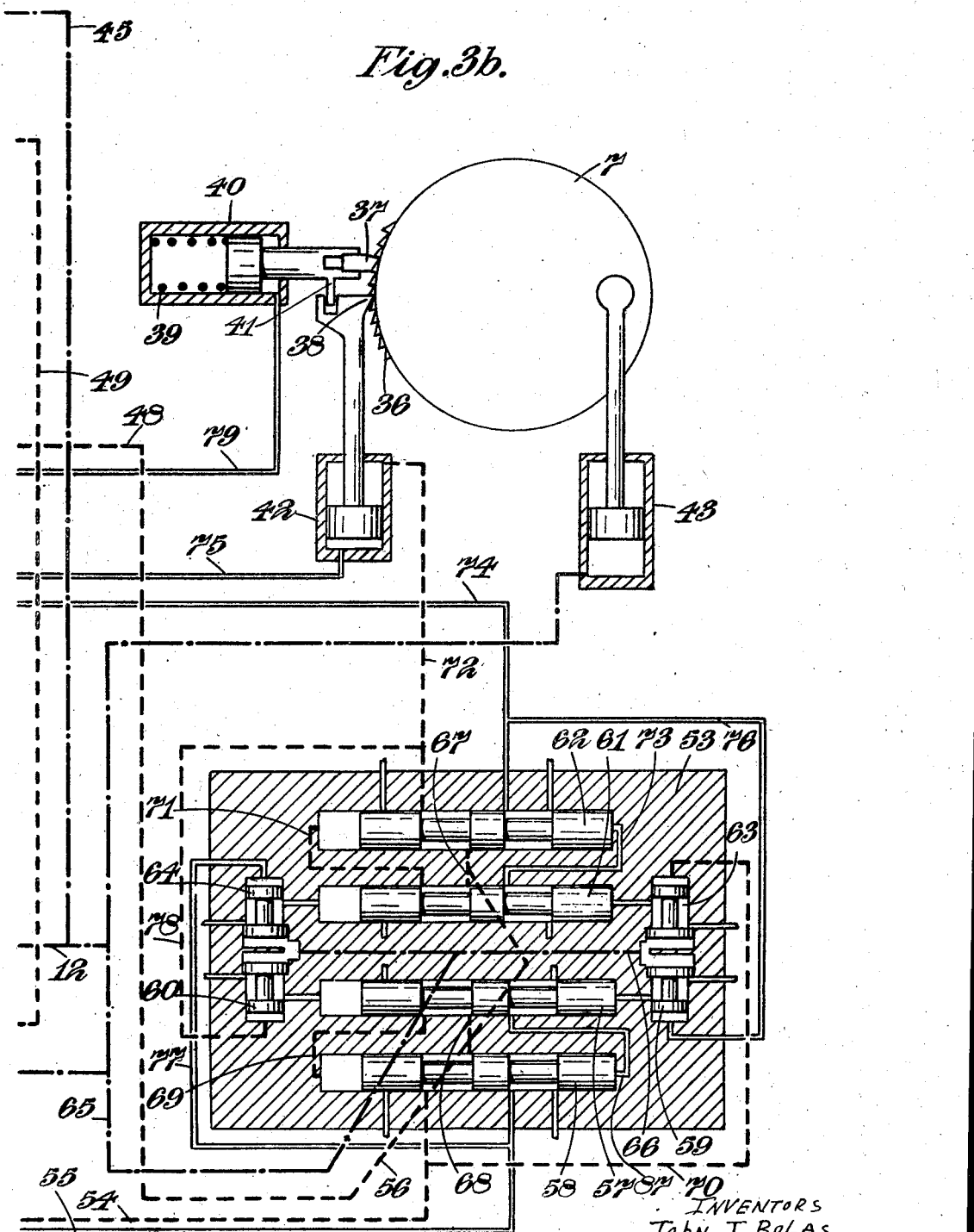

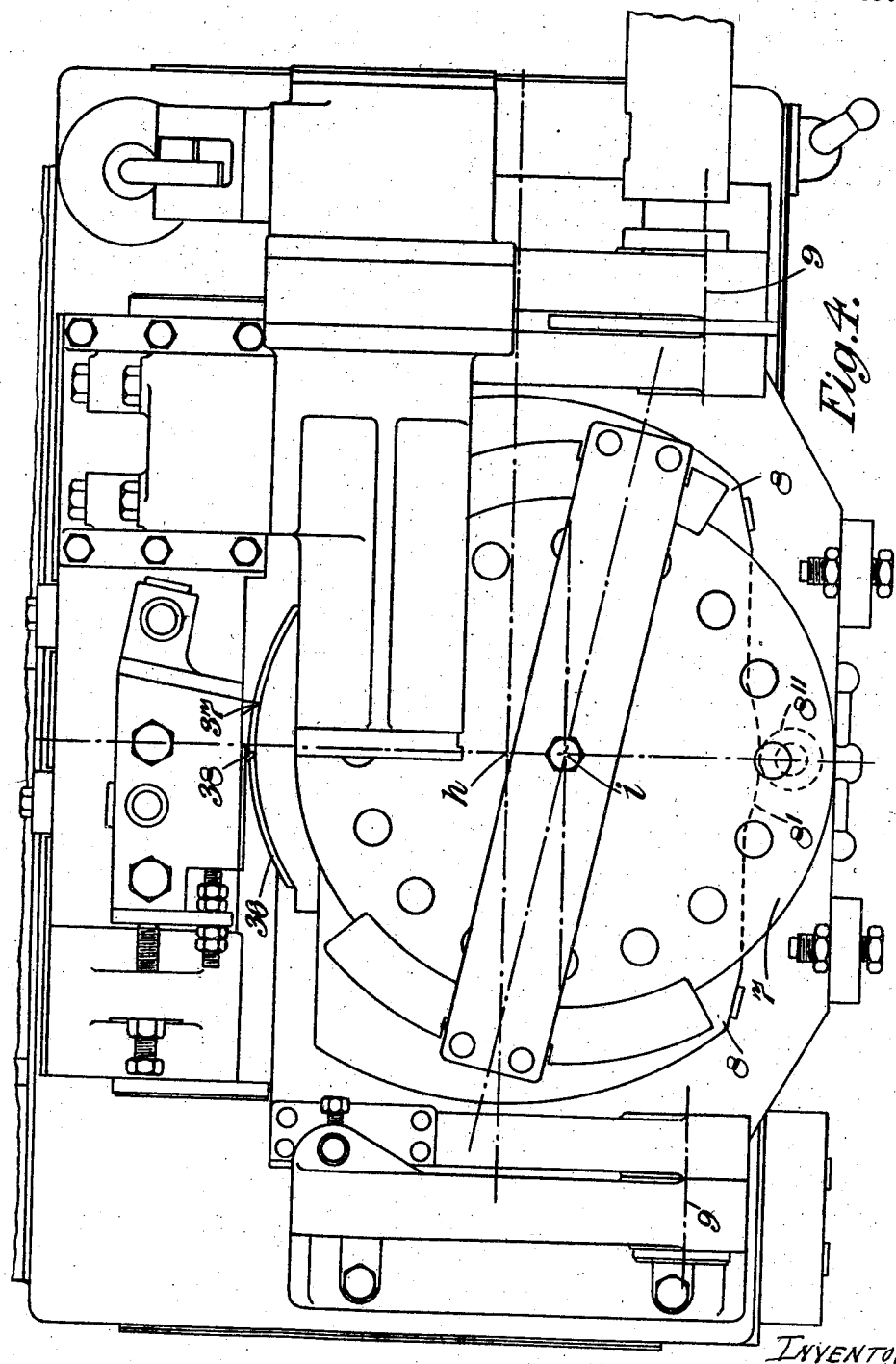

Patented July 2, 1946

2,403,168

UNITED STATES PATENT OFFICE 2,403,168

MACHINE FOR PRODUCING CONVEX SURFACES

John Thomas Bolas, Raymond William Edwards, and William Joseph Latty, Bristol, England, assignors to The Bristol Aeroplane Company Limited, Bristol, England, a British company Application May 30, 1944, Serial No. 538,024
In Great Britain May 25, 1943

8 Claims. (Cl. 90—31)

This invention concerns machines for producing surfaces which are of convex outline when viewed in one plane and which extend in a direction substantially normal to said plane. The latter extension of the convex surface is hereinafter referred to as being in the direction of the long axis of said surface.

As examples of such convex surfaces mention is made firstly of the convex radial surface which commonly extends along an edge smoothly to blend the surfaces meeting at said edge, and secondly of a ridge on a surface, the ridge being of semi-circular, elliptical, parabolic or other convex outline in cross-section and extending linearly or arcuately over said surface (that is along the long axis of the convex surface).

Heretofore a common method of producing such convex surfaces has consisted of moving a profiled rotary cutter of concave form (for example a milling cutter) along a linear or arcuate path with the plane of rotation of the cutter respectively parallel or tangential to said path. Since the cutter in producing said surface is moving along the long axis of the curved surface and since in its direction of advance the cutter extends beyond that point to which the surface has been formed, it follows that this method is precluded when it is desired to form said curved surface right up to a face against which the curved surface abuts.

It is an object of the present invention to provide a machine which will enable convex surfaces to be produced in the circumstances referred to above.

It is a further object of the invention to provide a machine which will form a convex surface under the circumstances referred to and which will at the same time blend said surface into the face which abuts said surface.

According to the present invention a machine for producing a surface of the form referred to is characterised in that said surface is produced by a tool which is reciprocated relatively to the work in a plane normal to the direction in which said surface extends and which is moved in said direction.

According to another feature of the present invention a machine for forming a convex surface along an edge of a work-piece is characterised in that said surface is produced by a cutter which is oscillated in a plane normal to the direction in which said edge extends about an axis coincidental with the centre of curvature of the convex surface and which is fed along said edge.

Preferably the cutter is moved along the convex surface in a series of steps each of which is performed in timed relationship with the movement of the cutter across said surface and whilst the cutter is in non-cutting relationship with the surface.

It is preferred that an oscillation of the cutter in one direction corresponds to a cutting stroke whilst an oscillation of the cutter in the opposite direction corresponds to a return stroke of the cutter, the arrangement being that when the cutter has completed its return stroke it automatically effects a feed movement immediately followed by a cutting stroke.

Figure 2:
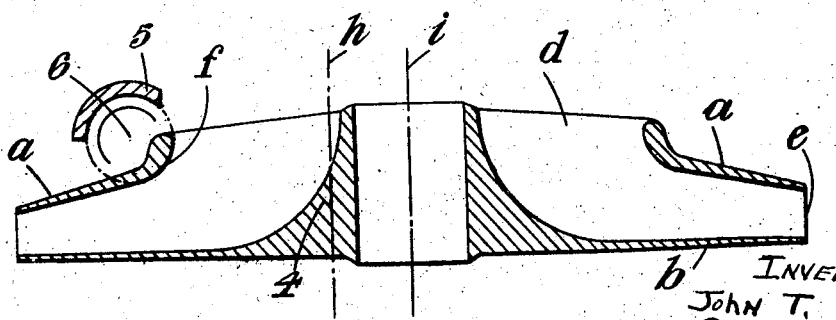

A specific embodiment of the invention as applied to a machine for forming a convex surface on an impeller for a centrifugal supercharger will now be described merely by way of example with reference to the drawings accompanying this specification in which:

Figure 1 is a view of part of a double-shrouded impeller for a centrifugal supercharger, the view being taken in a direction facing the eye of the impeller and the front shroud, Figure 2 is a section on the line II—II of Figure 1, Figures 3a and 3b together form a diagrammatic layout of a machine for performing certain operations on the impeller shown in Figures 1 and 2, and Figure 4 is a plan view of part of the machine showing the mounting for the impeller.

It is clear from Figures 1 and 2 that the impeller 4 comprises a front shroud a, a back shroud b and a plurality of equi-spaced radial blades c extending between the shrouds and from the eye of the impeller d to the periphery e thereof.

In order that such an impeller may be balanced at the high speeds for which it is designed to operate and is as light as is possible the faces shown in full lines in Figure 2 are fully machined. That portion of the inner face of the front shroud a shown at f has commonly been produced by hand work because of the difficulty of machining this face. It is now believed that certain out-of-balance forces which are set up at high speeds of rotation of the impeller are due to this hand working since the amount of metal removed at f varies around the impeller.

With a view to removing a constant amount of metal at face f from around the impeller the machine shown diagrammatically in Figures 3a and 3b has been evolved.

This machine must produce a convex surface f which terminates at both ends in blades c and which is blended as at $g^1$ and $g^2$ into said blades.

Moreover the surface $f$ is arcuate, the radial centre of which is coincidental with the centre $i$ of the impeller.

In view of the difficulties referred to hereinbefore of moving a profiled concave tool along face $f$ when the latter must blend into blades $c$ the machine incorporates an oscillating cutter 5 which is pivotally mounted at 6 (Figure 2). This cutter enters a pocket of the impeller eye $d$ to perform its cutting stroke. Upon the cutter engaging the shroud $a$ it shaves metal therefrom and produces the desired convex surface $f$. The cutter is withdrawn from the impeller eye during the return stroke. On the completion of each such return stroke the impeller as a whole is fed around centre $h$ by a small amount and another cutting stroke is then begun. The cutting thus proceeds until the cutter (which commenced machining at $g^1$) reaches $g^2$ whereupon the cutter is withdrawn from this pocket and the impeller is brought to a new indexing position to enable the cutter to operate on the face $f$ associated with the next adjacent pocket of the impeller eye.

It will have been noted that reference has been made to the centre of arcuate face $f$ being at $h$ and to the feed movement taking place about axis $i$. This impeller 4 (see Figure 3a) is mounted upon a plate 7 carried by a table 8 which is pivotally mounted at 9. The table 8 is capable of rotation about axis $i$ to enable the indexing operation to be performed, and plate 7 is carried on the table so as to be movable therewith. The table has a cam face 8' whch engages with a stationary roller 8" so that as the table is rotated it is also reciprocated. The plate 7 therefore has imparted to it a compound movement which ensures that as the cutter performs its cutting operation, face $f$ will have the contour desired: that is it will be an arc of centre $h$.

To enable the impeller 4 to be placed upon plate 7 prior to the machining operation commencing, to enable the indexing operation to be performed, and to enable the impeller to be removed after the operation has been completed, table 8 is lowered away from the cutter. When another impeller is mounted on plate 7 and when an indexing operation has been completed the table is raised to bring the impeller to the cutting position.

Oil under pressure from the constant delivery pump 10 passes to a twin-pressure valve 11 and then to the various circuits either as high-pressure or low-pressure oil. In Figures 3a and 3b the high-pressure oil circuit is shown as a dotted line, the low-pressure oil circuit as a chain dotted line and the exhaust circuit as a double line.

Low-pressure oil from valve 11 passes by pipe 12 to the valve 13 which controls the indexing and table positioning operations. The latter are performed respectively by an indexing cylinder 14 and a positioning cylinder 15. The passage of pressure oil to these two cylinders is brought about by hand control 16. When the latter is depressed, piston-valve 17 is raised and consequently pressure oil from pipe 12 passes to cylinder 14 and raises the indexing plunger 18. Pressure oil also passes from pipe 12 to the cylinder 15 thus raising the table. The impeller is thus locked in each indexing position before the table is raised.

To withdraw the indexing plunger 18 and lower the table 8, hand control 16 is raised. Piston-valve 17 assumes its lower position and pressure oil from pipe 12 passes to cylinder 14 to lower the indexing plunger 18. This movement of the plunger 18 is transmitted to valve 19 which is thereby set to permit low-pressure oil to pass to cylinder 15 to lower the table 8.

In the event that the indexing is incorrectly performed the plunger 18 will engage the underface of the indexing plate 104, and will thereby be prevented from moving upwardly in cylinder 14. Accordingly the low-pressure oil from pipe 12 which is directed to the bottom of the valve 19 is incapable of raising the latter since it abuts plunger 18. The valve 19 is thus maintained in its lower position in which pressure oil is prevented from passing to cylinder 15 to raise the table. When correct indexing is performed valve 19 is free to be raised to permit the pressure oil to pass to the cylinder 15 to enable table 8 to be raised to the cutting position.

It is necessary to ensure that the cutting operation cannot be commenced unless the table 8 is in its fully raised position. This is provided for by a plate 20 which is associated with the table and which is raised and lowered therewith. The plate 20 has a pair of notches; notch 21 corresponding to the fully raised table position and notch 22 the fully lowered position.

Associated with plate 20 is a plunger 23. This forms part of a valve 24 which controls the passage of high-pressure oil to the cutter and feed circuits, as is hereinafter explained. When the table 8 is fully raised or lowered notch 21 or 22 is respectively opposite plunger 23 so that valve 24 is capable of being moved to the left, that is of assuming its open position. Consequently the cutter and feed may both be brought into operation. At any position intermediate notches 21 and 22 the plunger 23 abuts plate 20 and prevents valve 24 opening.

As already stated the cutter 5 is pivotally mounted at 6 (Figure 2) and is oscillated into and out of each pocket of the impeller eye $d$. The cutter is of crescent shape and is carried by cutter shaft 25. The latter also carries the vane 26 of a hydraulic vane motor 27, the arrangement being that upon pressure oil passing to one side of vane 26 it moves the cutter in one direction and upon the pressure oil passing to the other side of vane 27 the cutter is moved in the opposite direction.

Associated with the cutter is a ring 28 which carries internal teeth 29 and external teeth 30. Engaging teeth 29 is a pawl 31 and engaging teeth 30 is a check pawl 32. It is to be noted that although in Figure 3a pawl 31 is shown as passing through shaft 25 nevertheless in actual practice the connection is through a gear train which ensures that for each single oscillation the pawl moves through an arc corresponding to slightly over the width of one of teeth 29.

Thus when pressure oil enters the vane motor 27 and turns the cutter shaft 25 anti-clockwise to perform the cutting stroke, pawl 31 slides over one of teeth 29. Pawl 32 remains in engagement with teeth 30 and prevents anti-clockwise rotation of the ring 28. Said anti-clockwise rotation of ring 28 is effected by a spring which is not shown. On the return stroke of the cutter (which is produced by vane motor 27 moving the cutter shaft clockwise) pawl 31 engages one of teeth 29 and rotates the ring 28 in a clockwise direction through the width of one of said teeth.

Each such movement of the ring 28 corresponds with each feed movement and when the cutting operation has been completed ring 28 will have moved from a starting position at which a hole 33 is spaced by a certain amount from a plunger 34 to a position in which the hole is brought under the plunger. The initial position of hole 33 in relation to plunger 34 corresponds to the commencement of the cutting operation when the feed is just started. The final position of hole 33 in relation to plunger 34 corresponds to the end of the cutting operation when the feed movement is completed.

The plunger 34 is urged during the cutting operation towards the left, i. e. against ring 28. Whilst the plunger 34 abuts the ring 28 pressure oil passes to the vane motor 27 and to the feed mechanism through a master control valve 35 with which the plunger is associated. When hole 33 is brought under plunger 34 it drops therein and valve 35 is set to stop the flow of pressure oil to the cutter and feed mechanisms.

It is clear therefore that when the cutter has completed its production of face $f$ and has reached edge $g^2$ the cutter and feed mechanism are rendered inoperative. Since each movement of ring 28 to move hole 33 towards plunger 34 occurs only during the return stroke of the cutter it follows that the plunger can only engage hole 33 to stop the cutter and feed operation during the last return stroke of the cutter i. e. only when the latter has been raised clear of the work.

The plate 7 is intermittently turned at the end of each return stroke of the cutter as will now be described.

Over a part of the periphery of plate 7 there are provided ratchet teeth 36 which are engageable by a pawl 38 and a check pawl 37. The pawls 37, 38 are normally held in engagement with the teeth by the pressure of a spring 39 located within cylinder 40. The piston rod in the latter carries pawl 37 and has an extension 41 to engage pawl 38.

Each time the cutter reaches the limit of its return stroke, pressure oil passes to the bottom of cylinder 42 (as more fully described hereinafter) to raise pawl 38 and thereby effect the feed movement of plate 7. Each time the cutter reaches the limit of its cutting stroke pressure oil passes to the top of cylinder 42 and pawl 38 is moved downwardly ready for the next feed movement. Check pawl 37 maintains plate 7 against rotation.

When the cutting and feed operations have been completed pressure oil passes to cylinder 40 to move it against the pressure of spring 39 and thereby withdraw pawls 37, 38 from teeth 36. Hydraulic motor 43 (against the lower face of which low pressure oil is always maintained) is then free to rotate plate 7 in an anti-clockwise direction to its starting position.

This intermittent feed movement of plate 7 is supplementary to the indexing movement whose action has already been described. Briefly the two movements may be considered to be an indexing movement to bring edge $g^1$ rapidly under the cutter followed by a series of intermittent steps which feed the work along under the cutter. When the intermittent feed movement has brought edge $g^2$ under the cutter it stops and is followed by an indexing movement to bring edge $g^1$ of the next adjacent pocket of the impeller eye under the cutter.

The above description has dealt with the indexing, table positioning, cutter operation and feed mechanism without reference to the means which are used to effect the operation of these. This now follows.

The start-and-stop manual control comprises a pilot valve 44 which is capable of endwise movement to control the passage of low-pressure fluid from pipe 45 to the master control valve 35 by way of pipes 46, 47.

To start the cutter operation (assuming that the table is in the fully raised position and plunger 23 lies opposite notch 21) pilot valve 44 is drawn to its extreme right-hand position so that low pressure oil passes from pipe 45 by pipe 47 to the left-hand side of master valve 35. This has the effect of raising plunger 34 out of hole 33 and moving the valve to the extreme right-hand position. It will be noted that in this position oil may drain from the right-hand side of valve 35 by pipe 46 and valve 44.

High pressure oil from pipe 49 passes through the automatic stop-start valve 50 and pipe 51 to valve 24. This is pushed to the left by the high-pressure oil and plunger 23 enters notch 21. Consequently the high-pressure oil is enabled to flow by pipe 52 to master valve 35 and the latter permits the oil to pass by pipe 48 to an automatic reverse valve mechanism generally indicated at 53. From the latter it flows by either pipe 54 or 55 to the vane motor 27 of the cutter.

In the position of the various valves just described the cutter is in operation but the feed mechanism is not since the feed cylinder 42 is cut-off from its source of high-pressure oil by master valve 35.

The movement of the master valve 35 to the extreme right-hand position by raising plunger 34 clear of ring 28 enables the latter to be turned anti-clockwise by spring means (not shown) until hole 33 assumes its extreme position from the plunger.

The pilot valve 44 on being returned to its extreme left-hand position connects pipe 47 to drain and pipe 46 with the low pressure oil from pipe 45. The master valve is accordingly moved to the left until plunger 34 abuts ring 28 and pawl 32 is brought into engagement with teeth 30. The master valve is then in a position to permit high-pressure oil from pipe 52 to continue to pass by pipe 48 to the automatic reverse valve mechanism 53 and thence to vane motor 27. In its new position however valve 35 also permits the high-pressure fluid from valve mechanism 53 to pass by pipes 74, 75 to the feed cylinder 42 so that the latter is operational.

The cutter and feed mechanism are now both in operation and the various parts of the machine are somewhat in the condition shown in Figures 3a and 3b.

As has been stated previously the cutter and feed operation are interconnected. This is done through the medium of the automatic reverse mechanism 53.

The high pressure oil for performing the cutting and feed operations derive from pipe 56 (and the master valve 35) and is directed to each mechanism to produce the desired function in the desired sequence by mechanism 53.

Mechanism 53 comprises two main parts: one associated with the cutter and the other with the feed operation. Both main parts are similar in construction. Thus associated with the cutter mechanism there is a pilot valve 57, a reverse valve 58, and a pair of change-over valves 59, 60. Similarly associated with the feed mechanism is a pilot valve 61, a reverse valve 62 and a pair of change-over valves 63, 64.

Each of the change-over valves is normally maintained by low-pressure oil from pipe 65, 66 in a position at which both ends of each pilot valve 57, 61 are connected to drain (see Figure 3b). The pilot and associated reverse valve are connected by pipes as shown.

The valve assembly 53 operates as follows:

High pressure oil from pipe 56 enters valve assembly 53 and is directed into branch pipes 67 and 68. The former is associated with the feed mechanism and the latter with the cutter mechanism.

For the cutter mechanism pilot valve 57 and reverse valve 58 are in their extreme right-hand position thus permitting the high pressure oil from pipe 68 to pass through the pilot valve 57 and by pipe 69 to valve 58 which is thereby held in the right-hand position. Consequently high-pressure oil is allowed to pass through valve 58 and by pipe 54 to vane motor 27.

The high-pressure oil also passes from pipe 54 by pipe 70 to change-over valve 63. This valve is maintained in the position shown in Figure 3b by the low-pressure fluid.

For the feed mechanism pilot valve 61 and reverse valve 62 are in their extreme right-hand position. High pressure oil from pipe 67 is thus enabled to pass through the pilot valve and by pipes 71 to valve 62. The latter is therefore held in its right-hand position permitting high-pressure oil to pass through the valve, and by pipe 72, to feed cylinder 42. This state of affairs was brought into being when the cutter reached the limit of its cutting stroke and has resulted in pawl 38 being moved downward ready for the next feed movement.

The above state continues until the return stroke of the cutter has been completed. When this happens vane 26 of motor 27 will have reached the limit of its clockwise movement and is therefore restrained from further motion. Oil from pump 10 continues to be delivered to the high-pressure system, and the pressure therefore rises.

This increase of pressure on being transmitted to change-over valve 63 opens it and the oil passes to the right-hand end of pilot valve 61. The latter is therefore moved to the left-hand whereupon high-pressure oil from pipe 67 is directed by pipe 73 to the right-hand side of reverse valve 62 which is then moved to the left and kept there.

High-pressure oil is then able to pass through valve 62 and by pipe 74 to master valve 35 and then to feed cylinder 42 by pipe 75. Pawl 38 is raised and table 7 rotated by one feed movement.

The high-pressure oil upon entering pipe 74 is carried by pipe 76 to change-over valve 59 which is therefore opened to allow the pressure oil to the right-hand side of pilot valve 57. When this is moved to the left by the pressure oil it directs the latter through pipe 87 to the reverse valve 58 which is also moved to the left. This permits high-pressure oil to pass through the valve and to pipe 55. The vane motor 27 is therefore moved anti-clockwise and the cutter performs its cutting stroke.

A similar sequence of events is followed when the cutting stroke is completed and the vane 26 of motor 27 has reached the limit of its travel in an anti-clockwise direction. These events may be summarized as follows:

(a) the pressure in the hydraulic system is raised throughout. This increased pressure on being transmitted through pipe 77 to change-over valve 64 opens the latter.

(b) as a result of the change-over valve 64 opening pilot valve 61 and subsequently reverse valve 62 move to their right-hand positions.

(c) pressure oil therefore passes to feed cylinder 42 by pipe 72 to retract pawl 38 ready for the next feed movement. The pressure oil is also transmitted to change-over valve 60 by pipe 78 and is accordingly opened.

(d) as a result of change-over valve 60 opening pilot valve 57 and subsequently reverse valve 58 move to their right-hand positions.

(e) pressure oil therefore passes to vane motor 27 by pipe 54 and the cutter performs its return stroke.

At the conclusion of the latter the pressure build up produced the series of valve changes described above with the final result that the feed movement takes place and then the cutting stroke is begun.

The sequence of cutter strokes, valve changes, and feed movements details is followed until the condition shown in Figures 3a and 3b is reached. These figures show the positions of the various parts whilst the cutting and feeding operations are effective with the cutter performing its last return stroke.

From this position when vane 26 reaches its extreme clockwise travel (that is the cutter has completed its last return stroke) hole 33 is brought under plunger 34 (as already described in detail) and valve 35 is moved by low-pressure oil towards the left so that the plunger enters the hole.

The master valve 35 when in this position prevents the flow of high-pressure oil from pipe 52 to pipe 48 and from pipe 74 to pipe 75. The cutter and feed operation therefore ceases with the cutter withdrawn from edge $g^2$, the surface $f$ having been produced. At the same time valve 35 permits high-pressure oil to pass from pipe 52 to cylinder 40 by pipe 79. This withdraws the check and feed pawls 38 and 37 respectively and the table 7 is returned to its starting position by motor 43 which is continuously supplied with low-pressure oil.

The operator is then required to perform three control movements to index the work for the machining of the next adjacent pocket of the impeller.

The first control movement is to rotate the manual control valve 44 through 90 degrees in a clockwise direction from the position shown in Figure 3a. It will be noted that this valve terminates in a rotary valve portion 80 (shown also in transverse section in Figure 3a) and that this rotation permits low-pressure oil from pipe 45 to be directed by pipe 81 into a cutter interlock valve 82. It is clear from Figure 3a that this valve is only open to the flow of pressure oil when the cutter is in the fully retracted position relative to the work. When this happens the pressure oil flows from the interlock valve by pipe 83 to the right-hand side of a stop-start valve 50. The latter consequently moves to the left and high-pressure oil is directed from pipe 49 to pipe 85 and then to valve 24; plunger 23 is thus withdrawn from notch 21.

The second control movement is to actuate the indexing and positioning control 16 to withdraw the indexing plunger 18 and then lower table 8.

The third control movement is to actuate control 16 after indexing has been performed so that the table 8 is raised and the indexing plunger 18 advanced to its locking position.

The second and third control movement have been described in detail above.

Manual control 44 is then rotated through 90° in an anti-clockwise direction so that it is returned to the position shown in Figure 3a. The low-pressure oil then passes by pipe 86 to the left-hand side of valve 50 which is moved to the right and set in the "start" position.

The operator then pulls valve 44 to its extreme right-hand position and thus starts the cutter operation as already described. The operator then pushes valve 44 to its extreme left-hand side position and this brings the feed mechanism into operation.

Finally in the event that during machining the operator wishes to stop the machine he will rotate the manual control 44 and hence the rotary valve 80 to enable pressure oil to pass to the interlock valve 82 and the stop-start valve 50 with the results already indicated. The machine is automatically brought to a standstill only when the cutter has completed the first return stroke after actuation of control 44 since it is only when this has happened that valve 82 is open for the passage of pressure oil to the stop-start valve 50.

In an alternative construction (not shown) in which a crescent-shaped grinder replaces the cutter the feed mechanism is operated continuously so that grinding occurs during the "cutting" and "return" strokes referred to above.

To enable this to be done the pilot, reverse and change-over valves 61, 62, 63 and 64 respectively of valve mechanism 53 which are associated with the feed mechanism are dispensed with. The feed plate 7 is continuously rotated in one direction by an electric motor which is started and stopped by a hydraulically actuated switch. To operate the latter, pipe 45 is connected to pipe 74 so that low-pressure oil from pipe 45 enters the master valve 35 by pipe 74 and is capable of being directed therefrom into pipe 75 which leads to the hydraulically actuated switch. It is to be noted that these two pipes (74 and 75) are placed in communication with each other through master valve 35 only when the cutter has commenced operating. When the latter stops (the surface f having been produced) the master valve 35 assumes a position which stops the flow of pressure oil to the hydraulically actuated switch and it thereupon opens to stop the electric feed motor.

I claim:

1. A machine tool comprising a cutter mounted to oscillate about one axis and perform cutting and non-cutting strokes alternately, a work-support mounted to turn relatively to the cutter about a second axis transverse to and spaced from the first axis, a fluid motor connected to the cutter to oscillate it about the first axis, feeding means for turning the work-support, relatively to the cutter, about the second axis step by step in one direction, a second fluid motor connected to the feed means to actuate it to effect one step of turning movement, a source of fluid under pressure, valve means actuated by the cutter motor at the end of each non-cutting stroke of the cutter to admit fluid from said source to the second motor to actuate it to turn the work-support relatively to the cutter through one step.

2. A machine tool comprising a cutter mounted to oscillate about one axis through cutting and return strokes alternately, power means for oscillating the cutter about that axis, a work-support mounted to turn relatively to the cutter about a second axis spaced from and transverse to the first axis, stepping means for turning the work-support about the second axis step by step, a reversible fluid motor connected to the stepping means to actuate it to effect one step of movement when the motor makes a feed stroke in one direction and to reset the stepping means when the motor makes a return stroke in the other direction, a source of fluid under pressure, and valve means actuated by the means for oscillating the cutter to admit fluid from the source to the motor to cause it to make a feed stroke when the cutter reaches the end of each return stroke and to admit fluid to the motor to cause it to make a return stroke when the cutter reaches the end of each cutting stroke.

3. A machine tool comprising a cutter mounted to oscillate about one axis through cutting and return strokes alternately, a reversible fluid motor connected to the cutter to rock it about said axis in one or the other direction depending on the direction of action of the motor, a work-support mounted to turn about a second axis transverse to and spaced from the first axis, feeding means for turning the work-support about the second axis step by step, a second reversible fluid motor connected to the feeding means to actuate it to feed the work-support or reset it depending on the direction of action of the motor, a source of fluid under pressure, and valve means which connect the source to the motors and is operable cyclically to reverse the connections to each motor alternately to make the first motor make a cutting stroke, the second motor a reset stroke, the first motor a return stroke and the second motor a feed stroke in sequence.

4. A machine tool according to claim 3, wherein the valve means comprises two reversing valves in the connections from the source of fluid to the fluid motors respectively and operable each to reverse the direction of action of the associated motor, and separate actuating means for each reversing valve which means is subjected to the fluid pressure in the motor associated with the other reversing valve to be actuated thereby to reverse the setting of its reversing valve and, in opposition to said pressure, to a load which maintains the actuating means inoperative until said fluid pressure rises above a normal value on the motor reaching either end of its stroke.

5. A machine tool according to claim 2, comprising also a device movable step by step from an initial position to one in which it stops further operation of the machine, means actuated by the power means for oscillating the cutter to move said device one step during each return stroke of the cutter, means for restarting the machine, and means for resetting said device to its initial position when the machine is restarted.

6. A machine tool according to claim 3, comprising also a master valve controlling the supply of fluid from the source to the motors, a device operative to adjust said valve to provide a supply of fluid to the motors and movable step by step to a position in which it adjusts the valve to interrupt the supply of fluid to the motors to stop the machine, means actuated by the motor for the cutter during each return stroke of the cutter to move said device one step, and means for resetting said device to its initial position when the machine is started in operation.

7. A machine tool according to claim 3, comprising a master valve controlling the supply of fluid from the source to the motors, means biasing said valve to close and interrupt the supply of fluid to the motors, an abutment holding the said valve open against the bias on it to provide a supply of fluid to the motors and adjustable step by step from an initial position to one in which it releases said valve which thereupon closes to stop the machine, means operable by the motor for the cutter to advance the abutment one step during each return stroke of the cutter and means for resetting the abutment to its initial position when the machine is restarted.

8. A machine tool comprising a cutter mounted to oscillate and perform cutting and return strokes alternately, a fluid motor connected to the cutter to oscillate it, a work-support mounted to turn about a second axis normal to and spaced from the first axis and also mounted to move from a normal position away from the cutter to allow of a work-piece being mounted on it, means for stepping the work-support in one direction about the second axis, a second fluid motor arranged to actuate the stepping means, a source of fluid under pressure, valve means connecting the motors to the source of fluid and operable automatically to change the connections in sequence to adjust the motors to operate the cutter through a cutting and return stroke followed by a step of movement of the work-support in sequence, a master valve controlling the supply of fluid from the source to the motors, means adjusting the master valve to provide a supply of fluid to the motors and operable by the motor for the cutter during the last of a predetermined number of return stokes of the cutter to adjust the master valve to interrupt the supply of fluid to the motors and stop the machine, means for restarting the machine, and a locking valve normally permitting fluid from the source to pass through the master valve to the motors but operable by the work-support when it is moved away from the cutter from its normal position to interrupt the passage of fluid through the master valve.

JOHN THOMAS BOLAS.
RAYMOND WILLIAM EDWARDS.
WILLIAM JOSEPH LATTY.